United States Patent [19]

Jackson et al.

[11] Patent Number: 5,438,366
[45] Date of Patent: Aug. 1, 1995

[54] ASPHERICAL BLUR FILTER FOR REDUCING ARTIFACTS IN IMAGING APPARATUS

[75] Inventors: Todd A. Jackson, Pittsford; Robert H. Hibbard, Fairport, both of N.Y.

[73] Assignee: Eastman Kodak Company, Rochester, N.Y.

[21] Appl. No.: 342,994

[22] Filed: Nov. 21, 1994

Related U.S. Application Data

[63] Continuation of Ser. No. 40,040, Mar. 31, 1993, abandoned.

[51] Int. Cl.⁶ .............................................. H04N 5/72
[52] U.S. Cl. ................................ 348/342; 348/335; 348/340; 359/709; 359/723
[58] Field of Search ..................... 348/335, 340, 342; 359/676, 677, 678, 721, 722, 723, 707, 708, 709; H04N 5/72

[56] References Cited

U.S. PATENT DOCUMENTS

| | | | |
|---|---|---|---|
| 4,101,929 | 7/1978 | Ohneda et al. | 358/44 |
| 4,151,752 | 5/1979 | Perdijon | 359/709 |
| 4,518,864 | 5/1985 | Inuiya | 250/578 |
| 4,705,367 | 11/1987 | Eckbreth et al. | 359/676 |
| 4,896,217 | 1/1990 | Miyazawa et al. | 358/213.11 |
| 4,916,534 | 4/1990 | Takahashi et al. | 358/225 |
| 4,989,959 | 2/1991 | Plummer | 350/447 |
| 4,998,800 | 3/1991 | Nishida et al. | 350/162.2 |
| 5,029,010 | 7/1991 | Shiraishi | 358/225 |
| 5,121,213 | 6/1992 | Nishioka | 358/213.11 |
| 5,151,790 | 9/1992 | Takatori et al. | 358/225 |
| 5,233,431 | 8/1993 | Yoshida et al. | 358/227 |

FOREIGN PATENT DOCUMENTS

3248695-A 2/1990 Japan.
3-65922-A 3/1991 Japan.

*Primary Examiner*—Joseph Mancuso
*Assistant Examiner*—Ngoc-Yen Vu
*Attorney, Agent, or Firm*—David M. Woods

[57] ABSTRACT

An optical blur filter having a substantially aspherical shape is used in imaging apparatus to limit high spatial frequencies incident upon an image sensor, and thereby to reduce undersampling artifacts. The filter images a circular blur pattern upon an array of nearby photosites. Due to its aspherical shape, the surface of the filter smoothly varies in relation to the field of view of a zoom lens in the apparatus so that the blur pattern maintains a substantially constant radius despite changes in the focal length of the zoom lens.

5 Claims, 4 Drawing Sheets

ASPHERICAL BLUR FILTER FOR REDUCING ARTIFACTS IN IMAGING APPARATUS

This is a Continuation of application Ser. No. 08/040,040, filed Mar. 31, 1993, now abandoned.

FIELD OF INVENTION

The present invention pertains to an optical low-pass filter used in the optical path of an electronic imaging system to reduce aliasing, or undersampling effects.

BACKGROUND OF THE INVENTION

An electronic imaging system typically produces a signal output corresponding to a viewed object by spatially sampling an image of the object in a regular pattern with an array of photosensitive elements, such as, for example, with a charge-coupled device (CCD) solid-state image sensor. In such an imaging system, it is well-known that detail components in the object which contain frequencies too high to be analyzed within the sampling interval of the sensor contribute to the amplitudes of lower frequency components, and thereby produce imaging errors commonly referred to as aliasing or undersampling artifacts. In particular, if spatial detail being imaged contains a high frequency component of a periodicity smaller than the pitch (periodicity) of each neighboring photosensitive picture element of the solid state image sensor, the subsequent detection of this high frequency component tends to result in a spurious signal due to aliasing.

In general, the electronic imaging system can minimize aliasing if its optical section has a frequency response that cuts off, or filters out, the higher frequency content of the object. As a result, the optical section generally employs an optical low pass filter to substantially reduce the high frequency component contained in the spatial detail of the image received by the image sensor. It is thus well-known in the prior art that the design of electronic imaging systems involves a trade-off between image sharpness and the susceptibility of the imaging system to aliasing distortions or undersampling artifacts.

To limit these artifacts, an optical filter such as, for example, a birefringent blur filter has become a common component in consumer color video cameras. U.S. Pat. Nos. 4,101,929 and 4,896,217 show typical examples of such filters. Such a filter is typically placed between a lens and the image sensor to provide a low-pass filter function which reduces the spatial frequency content of the object at frequencies above the Nyquist frequency of the photosensitive elements. This makes the imaging system less susceptible to aliasing distortion. For example, for many available sensors wherein equal pixel densities in each of the sensed colors provide that each of the sensed colors have the same Nyquist frequency, an achromatic low-pass, or "blur", function is effective in minimizing aliasing distortion. Such a function can be provided by a birefringent filter.

The birefringent blur filter is typically composed of filter plates manufactured from a crystalline material like quartz that exhibits a dual refraction effect when the crystal axes of the filter plates are oriented at an angle with respect to the plate surface. In this orientation, a randomly polarized ray of light passing through such a filter plate emerges as two separated polarized rays. The combination of several of such plates produces a multiple spot pattern from each incident point in the image. If this spot pattern distributes light energy over multiple photosensitive elements, then the effect of a blur is obtained. This will limit the optical transfer function of the system at spatial frequencies above the Nyquist frequency of the photosensitive elements. However, this type of filter suffers from the drawback that it is costly and complicated to manufacture. In addition, a practical birefringent filter tends to be rather large and thick. Indeed, the thickness required to achieve the desired blur requires a lens with a long back focal length in order to make room for the blur filter in the optical path. Space limitations often do not allow such an optical structure, and lens design becomes unduly complicated. Finally, since such a filter requires randomly, or nonpolarized, light, a polarizing filter cannot be allowed in such a system to obtain well known photographic polarizing effects.

It is also well known in the art to use a phase diffraction grating as a frequency selective filter to produce an image blur. For example, as shown in U.S. Pat. No. 4,998,800, the periodicity of an image of a diffraction grating projected onto a solid state image sensor is selected to be a multiple of the periodicity of the photosensitive picture elements, and a blurred image is obtained. This type of filter, however, suffers from the drawback that, instead of producing a tightly controlled pattern over a few photosensitive elements, it spreads light over many interference fringes (orders) theoretically out to infinity. In addition, it is difficult to control the energy distribution in the fringes in order to obtain an acceptable blur function covering a designated number of pixels. Moreover, the energy distribution is dependent upon wavelength.

As can be appreciated from the foregoing remarks, there is a need in the art for a physically small blur filter that is inexpensive and relatively simple to manufacture, yet produces a tightly controlled blur pattern that is not dependent upon polarization techniques. As an alternative to the birefringent blur filter and the phase diffraction grating, U.S. Pat. No. 4,989,959 discloses a pyramidal blur filter comprised of four wedges which divide incident light into four quadrants so that light from the same image point impinges, on the average, on several photosensitive elements in the image sensing device. A further alternative is described in Ser. No. 040,948 now U.S. Pat. No. 5,322,998, entitled "A Conical Blur Filter for Reducing Artifacts in Imaging Apparatus", which was filed on even date herewith by common assignee. In such imaging apparatus, an optical blur filter having a substantially conical shape is used to image a circular blur pattern upon an array of adjacent photosensitive elements. Both the pyramidal and the conical optical blur filters, however, suffer from the drawback that the size of the blur pattern is dependent upon the focal length of an imaging lens that is used in the optical section of the apparatus. This makes it difficult to use the apparatus with, for example, a zoom lens.

SUMMARY OF THE INVENTION

The aforementioned problems are solved by an imaging apparatus that generates an image signal from incident image light, and has its higher spatial frequencies limited by an aspherical blur filter to reduce undersampling artifacts. The apparatus includes an image sensor for generating the image signal from an array of photosites, and an optical section having an optical filter with a substantially aspherical shape. The optical filter is interposed in the path of the incident image light and oriented in relation to the image sensor so as to output a blurred image upon the photosites.

As further specified in the subordinate claims, the blurred image is a circular blur pattern and the surface of the filter is especially shaped such that the circular blur pattern has a substantially constant radius regardless of the focal length of an imaging lens that is used in the system.

The advantages of using a substantially aspherical blur filter include simpler and less complicated manufacture, and a tightly controlled blur pattern that is independent of wavelength or of the polarization state of incident image light. A camera system employing this filter, therefore, can be used with popular polarizing filters. In addition, the small size of the filter insures that it will fit within compact apparatus. Most importantly, for purposes of the present invention, the size of the blur pattern is also independent of the focal length of the lens used in the apparatus.

BRIEF DESCRIPTION OF THE DRAWINGS

The prior art and the invention are described in relation to the drawings, wherein.

DESCRIPTION OF THE PREFERRED EMBODIMENTS

Since electronic imaging apparatus, particularly electronic cameras using solid state sensors, are well known, the present description will be directed in particular to elements forming part of, or cooperating more directly with, apparatus in accordance with the present invention. Elements or techniques not specifically shown or described herein may be selected from those known in the art. For instance, geometrical relationships of the optical components are not shown or described in detail, except where necessary to describe the invention. Moreover, relative sizings of components shown in the figures are not meant to be taken to scale, since the necessary geometrical relationships and sizings can be readily discerned by one of ordinary skill in this art.

Figure 1:
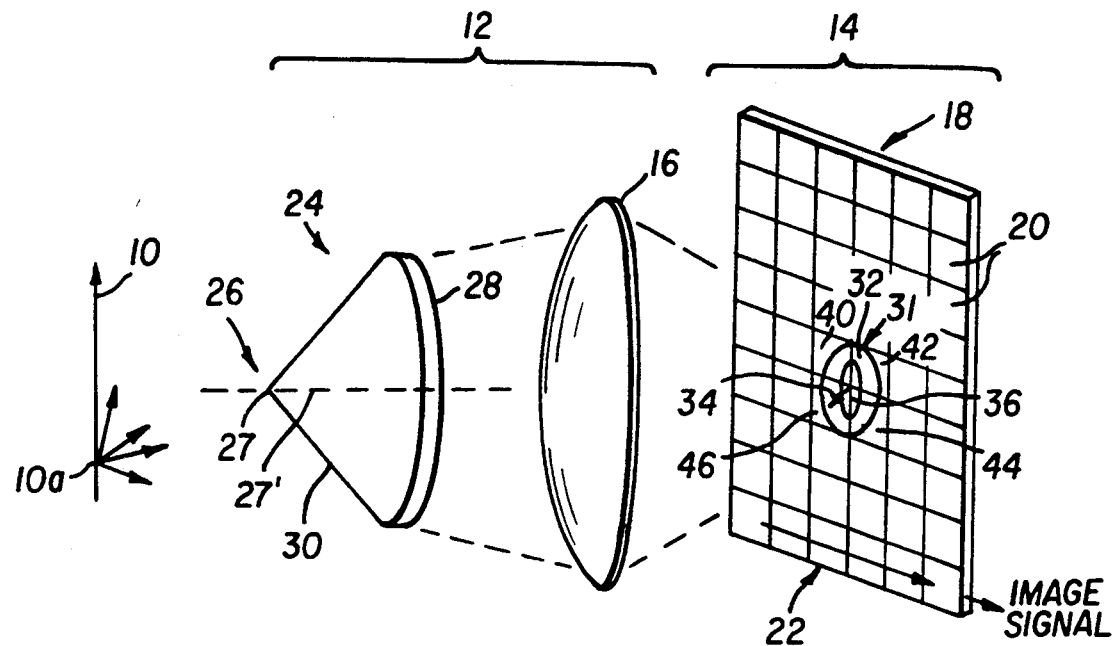
FIG. 1 is an illustration of a prior imaging system using a conical blur filter.
Figure 2:
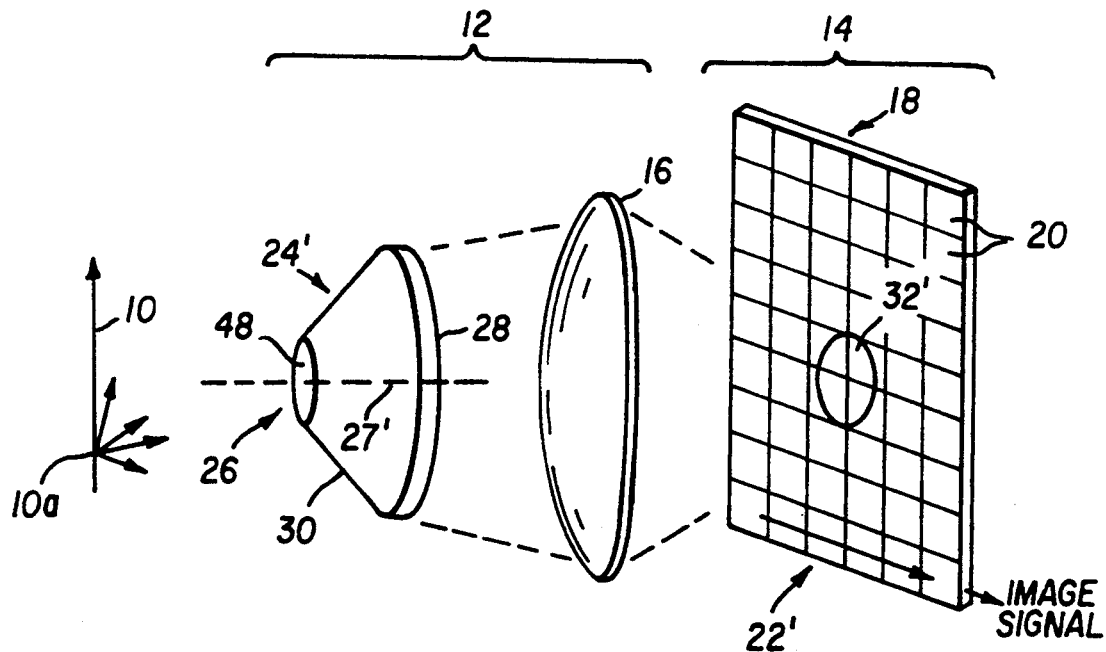
FIG. 2 is an illustration of another prior imaging system showing a conical blur filter with a flattened tip.
Figure 3:
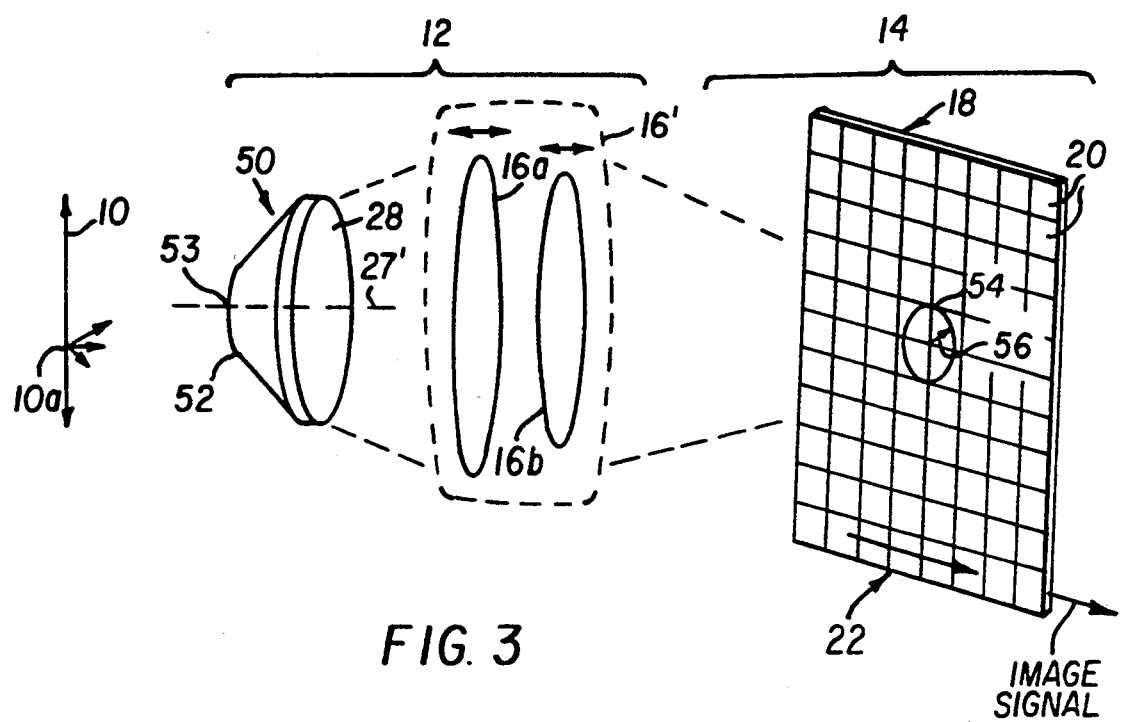
FIG. 3 is a preferred embodiment of the invention showing a substantially aspherical blur filter with a shape designed to accommodate a zoom lens having a variety of focal lengths.

FIGS. 1 and 2 respectively show known embodiments of a conical blur filter, as described in the aforementioned Ser. No. 040,948 now U.S. Pat. No. 5,322,998, "A Conical Blur Filter for Reducing Artifacts in Imaging Apparatus". FIG. 3 shows the preferred embodiment of the present invention. In each figure, the same reference character will be used wherever possible to refer to the same component. An image of an object 10 is optically processed in an optical section 12 and converted into an image signal in an imaging section 14. The imaging section 14 includes an image sensor 18 comprised of a two-dimensional array of photosites 20 and an output register 22 for outputting the image signal. Referring first to FIG. 1, the optical section 12 includes a lens 16 and a substantially transparent conical filter 24 having a vertex region 26, a base 28, and a conical surface 30 therebetween defined relative to an axis 27'. The axis 27' is oriented toward incident image light from the object 10 so as to output a blurred image of the object 10 upon the photosites 20. In the prior embodiment of FIG. 1, the vertex region 26 includes a vertex point 27 on the axis 27'.

Figure 7A:
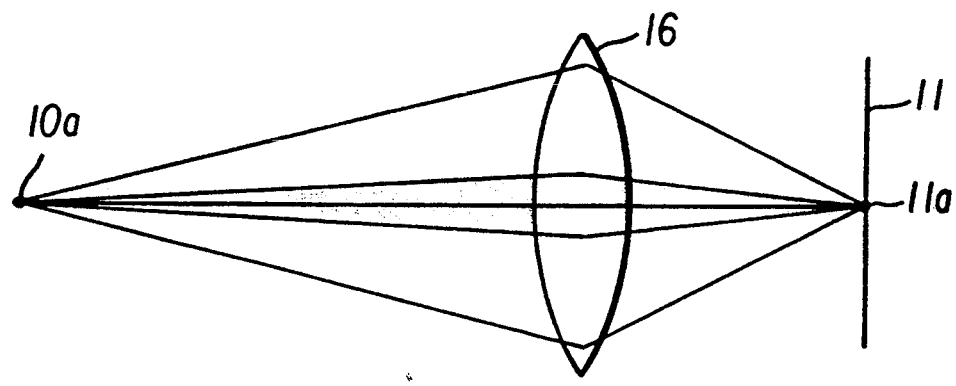
FIGS. 7A, 7B, and 7C are geometrical diagrams helpful in explaining the preceding figures.
Figure 7B:
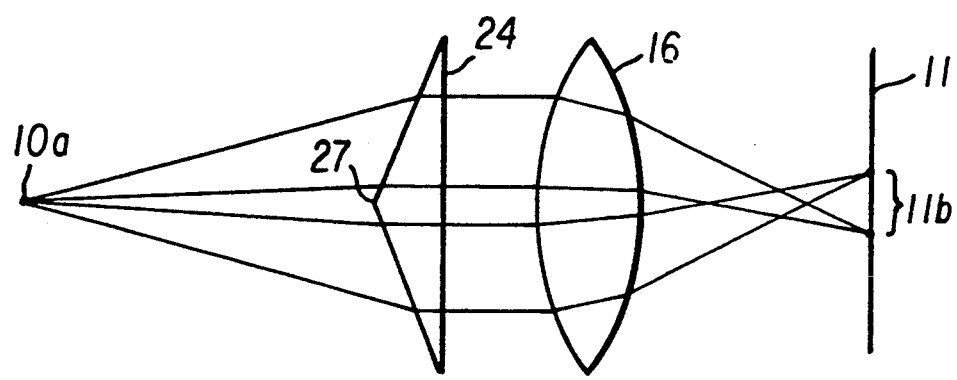
Figure 7C:
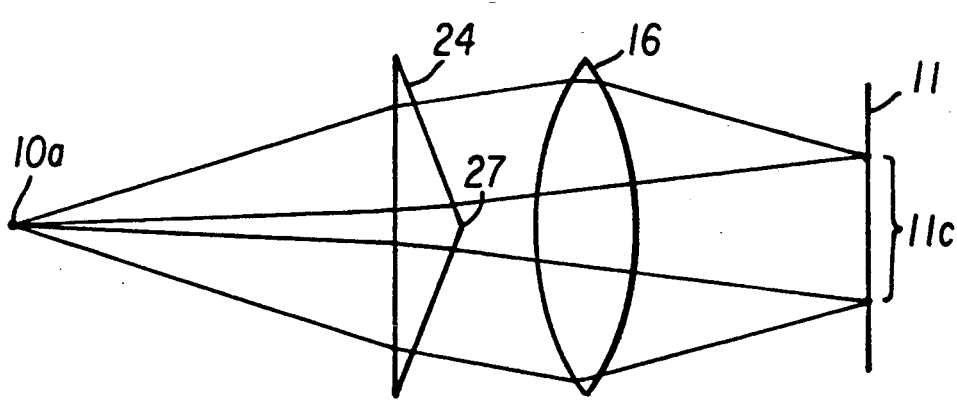

The conical shape of the filter 24 maps each point in the image into a circular pattern at the focal plane of the lens 16, thereby effecting a low pass blur function. For instance, in FIGS. 7A, 7B, and 7C, the effect upon an image of a conical optical element versus a simple lens is shown. In FIG. 7A, a conventional lens 16 images a point source 10a as a point image 11a in the image plane 11. Little or no blurring occurs. By comparison, FIG. 7B shows the same lens 16 with the conical filter 24 (shown in cross section) interposed in the path of incident image light between the lens 16 and the point source 10a. By orienting the vertex 27' toward the point source 10a, an annular blur spot 11b is imaged upon the image plane 11. By orienting the vertex 27 of the conical filter 24 toward the lens 16, as shown in FIG. 7C, a blur spot 11c is imaged upon the image plane 11. The difference in the blur spots 11b and 11c is in the ray paths, as shown in FIGS. 7B and 7C.

Referring again to FIG. 1, a point 10a on the object 10 emits light rays that are imaged as a circular blur pattern 31 on the image sensor 18, which is positioned at the focal plane of the lens 16. The blur pattern 31 has an annular blurred region 32 having an average radius 34 and a central clear region 36. The size of the annular region 32 depends upon the geometrical arrangement of the filter 24 and lens 16 relative to the image sensor. In FIG. 1, the geometry is chosen such that the blur pattern 31 equally covers four adjacent photosites 40, 42, 44, and 46. In FIG. 2, a second prior embodiment is shown in which the vertex region 26 has been flattened to form a flat tip 48 in place of the vertex point 27, thus forming a flattened conical filter 24'. The main advantage of the flat tip 48 is to fill in the central clear region 36 (in FIG. 1) with image light and thereby to provide a filled blur pattern 32' as shown in FIG. 2. This results in a more uniformly blurred spot than can be provided with a simple annular shape.

The prior embodiments of FIG. 1 and 2 are intended for a particular lens focal length, and each new focal length will require different spacing of the filter 24 (or 24') and the lens 16 with respect to the image sensor 18 to maintain the same average blur radius 34. In contrast, the embodiment of FIG. 3 according to the invention does not require optimization for a particular lens focal length and hence performs well with a zoom lens 16'. As shown in FIG. 3, the zoom lens 16' has a plurality of lens elements 16a and 16b which are capable of movement relative to each other to effect a variety of focal lengths. A substantially aspherical blur filter 50 has a smoothly varying surface 52 with a vertex region 53. The axis 27' of the blur filter 50 is oriented toward the incident image light. The filter 50 provides a blur disc 54 on the image sensor 18 with a substantially constant radius 56 for each of the focal lengths provided by the zoom lens 16'.

Figure 4:
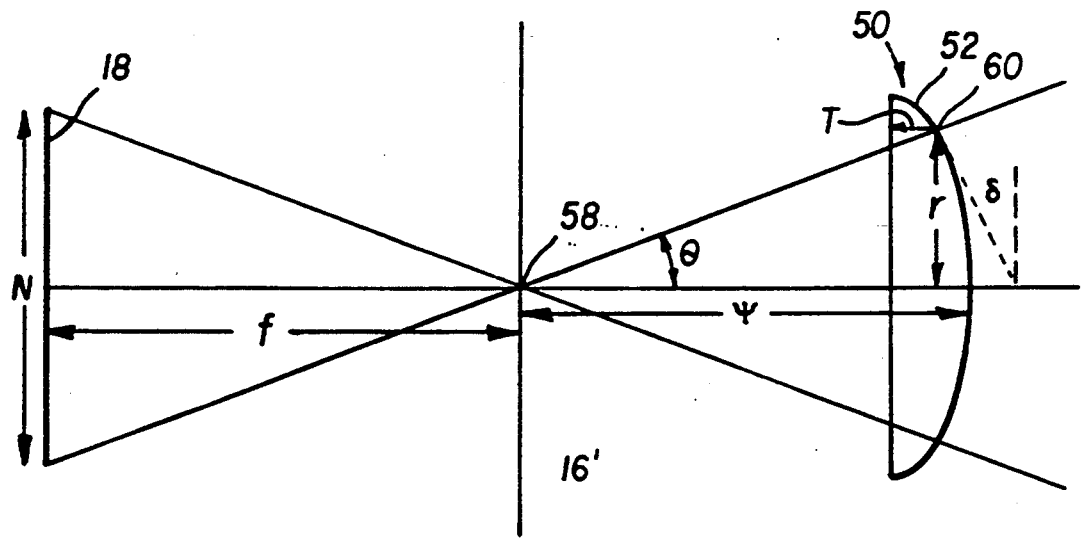
FIG. 4 shows a ray diagram useful in describing the geometry of the embodiment shown in FIG. 3.

The shape of the substantially aspherical blur filter 50 is optimized for a range of focal lengths by using the dependence of the field of view of the lens 16' on focal length. As shown in FIG. 4, for a zoom lens set to its minimum aperture and to its maximal focal length f, and with the aspherical blur filter 50 located a distance $\Psi$ in front of the nodal point 58 of the lens 16', the ray collected at the maximal field of view angle $\theta$ intersects the blur filter at an intersection 60 for a radius $r = (\Psi/f)(W/2)$, where W is the size of the sensor 18 at the image plane, which in turn determines the maximal field of view angle $\theta$. The angle $\theta$ subtends an area on the filter's surface equivalent to the projection of the lens' entrance pupil. Let the slope of the blur filter surface at the intersection 60 of the pupil's projection produce the proper blur diameter $S = 2\delta f(n-1)$, where $\delta$ is the angle of the slope in milliradians measured relative to a perpendicular to the optical axis, S is the blur diameter in microns (twice the radius 56), f is the focal length in millimeters, and n is the optical index of the filter material. Now, as the focal length f of the zoom lens 16' is adjusted to smaller values, the field of view increases, and the projection of the lens' entrance pupil onto the curved surface of the blur filter increases in radius r. At each focal length, the slope $\delta$ of the blur filter surface at the intersection 60 of the entrance pupil projection onto the filter's surface is set to produce the desired (fixed) blur diameter S.

Figure 5:
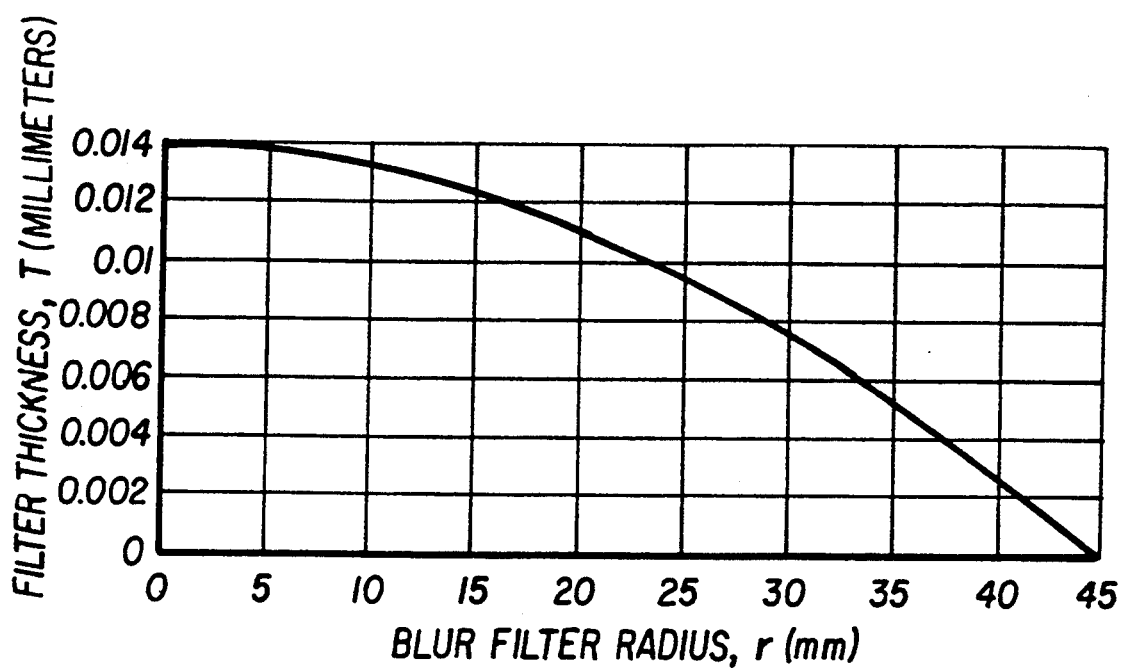
FIG. 5 is a graph showing an example of the contour of the surface of the blur filter shown in the embodiment of FIG. 3.

The blur filter surface is thus a continuous smoothly curving surface defined by a slope $\delta = S/(2f(n-1))$ at radius $r = (\psi/f)(W/2)$, i.e., $\delta = rS/(\psi W(n-1))$ where r, S, $\psi$, and W are measured in mm. Assuming that the filter is designed for a maximal focal length of infinity, the filter attains a zero slope at zero radius. Utilizing the slope angle, the filter 24 can further be characterized in terms of its thickness T for any radius r, which is a more useful relationship for manufacture of the correct surface 52. The equation describing the filter thickness T vs radius is: $T(r) = T(0) + [\psi W(n-1)/S]$ ln $[\cos(rS/\psi W(n-1))]$, where T(0) is the thickness at the center of the filter. A plot of the blur filter shape, thickness vs. radius, for $\psi = 30$ mm, $W = 43$ mm, and $n = 1.5$ is shown in FIG. 5, where the vertical axis (filter thickness) represents the surface profile of the blur filter 50. While the preferred surface 50 may be defined in terms of the preceding mathematical relationships, the inventors are using the term "substantially aspherical" for purpose of this disclosure to include this shape and other substantially similar shapes that obtain a similar blurring effect, and expect that the claims should be construed in keeping with the spirit of this term.

Figure 6:
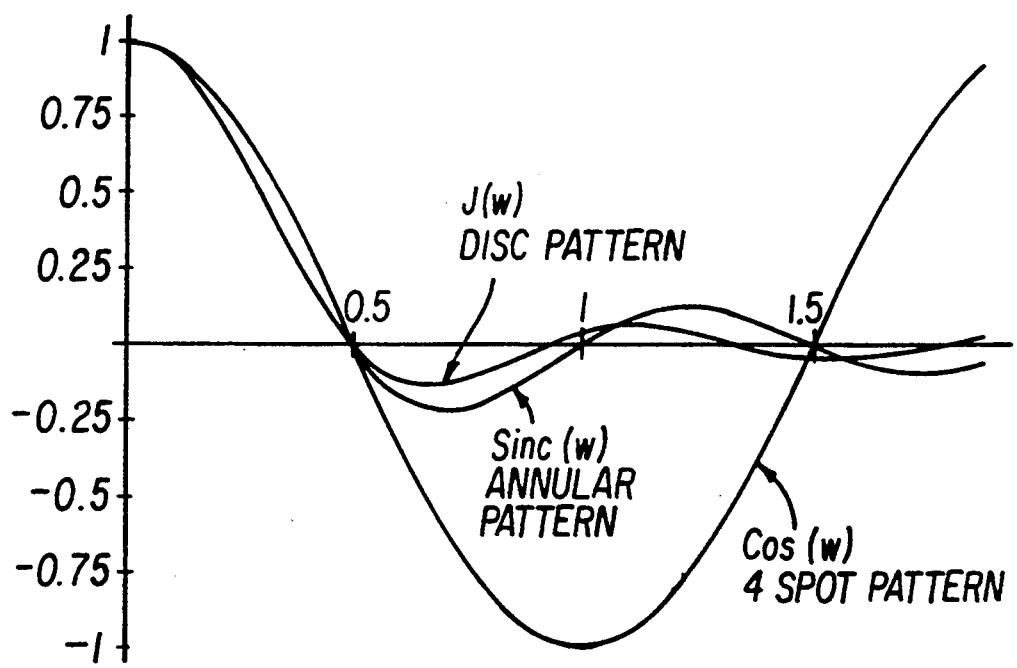
FIG. 6 is a comparative diagram of the frequency responses of an annular blur pattern, a disc blur pattern, and a four spot blur pattern.

The aspherical blur filter 50 shown in FIG. 3 has a number of desirable properties, including:

1. The blur spot is a disc 54 of substantially uniform intensity and diameter S regardless of lens focal length;
2. The filter may be used with either zoom or fixed focal length lenses by positioning the filter at the proper spacing $\psi$ in front of the nodal point of the lens;
3. The blur disc 54 has a spatial frequency response equal to a circularly symmetrical first order Bessel function which is near optimal for blur applications. In comparison, the pyramid's four spot pattern and the fixed-slope conical filter's annular pattern yield, respectively, circularly symmetrical cosinusoidal and sinc functions. These three frequency responses are compared in FIG. 6 where it is seen that frequencies above the first zero crossing are attenuated rapidly by both the conical blur filter and the aspherical zoom lens blur filter, with the aspherical zoom lens filter attenuating most rapidly;
4. For a given focal length, the lens' entrance pupil projection onto the filter must be independent of the lens aperture to maintain a constant blur spot radius. For many lenses, aperture changes will affect the pupil size. To correct for this, the filter to lens spacing $\psi$ can be adjusted as a function of aperture to correct for pupil projection size changes;
5. Rather than being implemented as a separate optical component, this blur function may be implemented as an additional property of an existing component of an optical system; and
6. Since the blur disc diameter S is dependent on spacing $\psi$, the spacing can be increased dynamically to correct the blur spot size when subsampling the image data from a sensor.

Manufacture of the substantially aspherical structure 50, shown in the embodiment of FIG. 3, is believed to be within the skill of an ordinary artisan. For example, the filter could be cut out of a plastic, such as polymethyl methacrylate, by using a submicron resolution lathe (such as the ASG-2500T submicron lathe manufactured by Rank Pneumo, a subsidiary of Rank America, Inc.). The cut part would then be polished and would serve as a master from which a mold could be formed. Conventional injection molding of plastic or glass could then be used to produce copies of the part.

As is evident from the foregoing description, certain aspects of the invention are not limited to the particular details of the example illustrated, and it is therefore contemplated that other modifications and applications will occur to those skilled in the art. It is accordingly intended that the claims shall cover all such modifications and applications as do not depart from the true spirit and scope of the invention. For instance, as was shown in FIGS. 7A, 7B, and 7C in connection with the conical blur filter, the vertex region 53 of the aspherical blur filter 50 may be oriented along the axis 27' in either direction, that is, either toward the object 10 or toward the sensor 18.

PARTS LIST

10 OBJECT
10A POINT
12 OPTICAL SECTION
14 IMAGING SECTION
16 LENS COMPONENT
16' ZOOM LENS
16A LENS ELEMENT
16B LENS ELEMENT
18 IMAGE SENSOR
20 PHOTOSITES
22 OUTPUT REGISTER
24 CONICAL FILTER
24' FLATTENED CONICAL FILTER
26 VERTEX
27 VERTEX POINT
27' AXIS
28 BASE
30 CONICAL SURFACE
31 CIRCULAR BLUR PATTERN
32 ANNULAR BLURRED REGION
32' FILLED BLUR PATTERN

34 AVERAGE RADIUS
36 CENTRAL CLEAR REGION
40 PHOTOSITE
42 PHOTOSITE
44 PHOTOSITE
46 PHOTOSITE
48 FLAT TIP
50 SUBSTANTIALLY CONICAL BLUR FILTER
52 SURFACE
53 VERTEX REGION
54 BLUR DISC
56 CONSTANT RADIUS
58 NODAL POINT
60 INTERSECTION POINT

What is claimed is:

1. An electronic imaging apparatus for producing an image signal representing the image of an object disposed on an optical axis, said apparatus comprising:
  (a) an image sensor located at a fixed position along said optical axis, said sensor comprising a two-dimensional array of photosites and being adapted to produce said image signal representing the image of said object projected onto said photosites;
  (b) a zoom lens located at a fixed position along said optical axis, said zoom lens having a plurality of focal lengths and being adapted to project said image of said object onto said photosites; and
  (c) a blur filter located at a fixed position along said optical axis for limiting high spatial frequency image information in the projected image to reduce undersampling artifacts, said blur filter comprising a transparent optical element having an aspherical surface defined by the equation, $$\delta = rS/(\psi W(n-1)),$$

where $\delta$ is the slope angle, measured from a line perpendicular to the optical axis, at each point on the aspherical surface; r is the radius, measured from the optical axis, at which the slope angle of each of said points is measured; $\psi$ is the distance between the zoom lens and the aspherical surface measured along the optical axis; W is the maximum dimension of the photosite array measured in a direction perpendicular to the optical axis; and n is the refractive index of said transparent optical element, so as to produce, on the photosites, a blur disc pattern for each point source of said object, wherein said blur disc pattern has a substantially constant radius for each of said plurality of focal lengths of said zoom lens.

2. The apparatus as defined by claim 1 wherein said aspherical surface is oriented on said axis toward said object.

3. The apparatus as defined by claim 1 wherein said aspherical surface is oriented on said axis toward said image sensor.

4. The apparatus as defined by claim 1 wherein said zoom lens is positioned between said blur filter and said image sensor on said optical axis.

5. The apparatus as defined by claim 1 wherein said blur filter has a thickness T measured at the radius r from the optical axis defined by the equation, $$T(r) = T(0) + [\psi W(n-1)/S] \times \ln [\cos (rS/\psi W(n-1))],$$

where T(0) is the thickness at the center of the filter.

* * * * *